US012771540B2

(12) United States Patent
Swaminathan

(10) Patent No.: US 12,771,540 B2
(45) Date of Patent: Oct. 20, 2026

(54) END-TO-END EMAIL ENCRYPTION USING A PUBLIC KEY DISTRIBUTION FRAMEWORK

(71) Applicant: Kishore Swaminathan, Willowbrook, IL (US)

(72) Inventor: Kishore Swaminathan, Willowbrook, IL (US)

( * ) Notice: Subject to any disclaimer, the term of this patent is extended or adjusted under 35 U.S.C. 154(b) by 0 days.

(21) Appl. No.: 19/260,397

(22) Filed: Jul. 4, 2025

(65) Prior Publication Data

US 2025/0337573 A1 Oct. 30, 2025

Related U.S. Application Data

(62) Division of application No. 18/241,959, filed on Sep. 4, 2023, now Pat. No. 12,401,508.

(51) Int. Cl.
*H04L 9/30* (2006.01)
*H04L 9/08* (2006.01)

(52) U.S. Cl.
CPC .............. *H04L 9/30* (2013.01); *H04L 9/0819* (2013.01); *H04L 9/0894* (2013.01)

(58) Field of Classification Search
CPC ... H04L 9/3247; H04L 9/0819; H04L 9/0894; H04L 9/30
See application file for complete search history.

(56) References Cited

U.S. PATENT DOCUMENTS

| | | | | |
|---|---|---|---|---|
| 9,686,073 | B2 * | 6/2017 | Goldstein | H04L 9/3249 |
| 2004/0148356 | A1 * | 7/2004 | Bishop, Jr. | H04L 51/58 709/206 |
| 2011/0293096 | A1 * | 12/2011 | Reilly | H04L 9/0833 380/277 |
| 2016/0365982 | A1 * | 12/2016 | Tutt | H04L 9/0869 |

OTHER PUBLICATIONS

Jones et al., "Layering public key distribution over secure DNS using authenticated delegation" [Online], Jan. 3, 2006 [Retrieved on: Mar. 25, 2026], ACSAC'05, Retrieved from: < https://ieeexplore.ieee.org/stamp/stamp.jsp?tp=&arnumber=1565268 > (Year: 2006).*

Cooper et al., "RFC5280: Internet X.509 Public Key Infrastructure Certificate and Certificate Revocation List (CRL) Profile" [Online], May 2008 [Retrieved on: Apr. 3, 2026], NWG, Retrieved from: < https://www.rfc-editor.org/rfc/pdfrfc/rfc5280.txt.pdf > (Year: 2008).*

* cited by examiner

*Primary Examiner* — Eric W Shepperd

(57) ABSTRACT

Described is a framework for associating and distributing public keys linked to email identifiers. In this system, an Internet domain specifies a Domain Key Authority (DKA) via a DNS record. The DKA collects, stores, and serves public keys for email IDs under that domain, verifying the binding between each email ID and its public key without relying on certificates or webs of trust. Multiple DKAs collectively form a logical infrastructure for distributing and retrieving public keys across the email namespace. Because email IDs are widely used to sign into various applications, this framework enables authentication without shared secrets or third-party authenticators. Other applications include email encryption, crypto wallets, and cryptographically secure services.

20 Claims, 10 Drawing Sheets

Figures 1, 2:
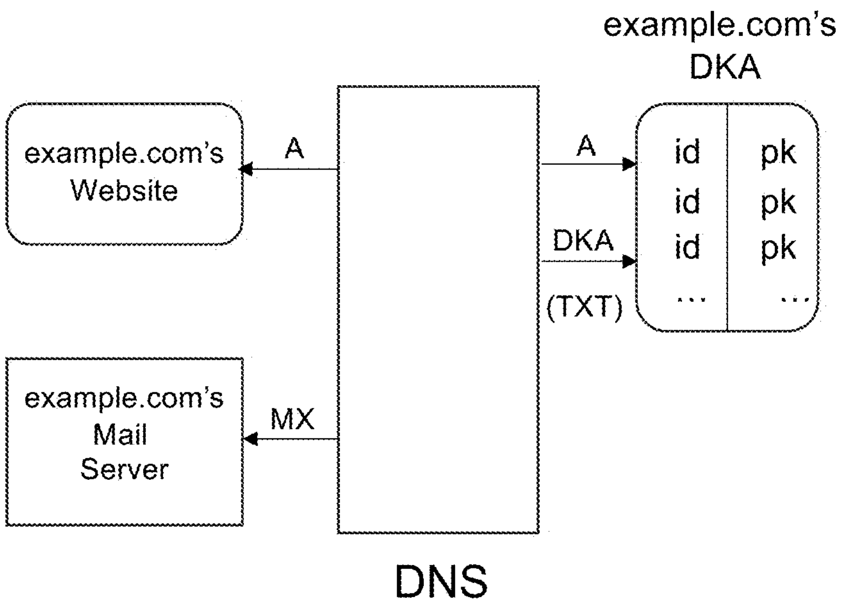

| Domain | Type | Value |
|---|---|---|
| example.com | A | IP address of website |
| example.com | MX | Address of mailserver |
| example.com | TXT | DKA; loc=https://dka.example.com |
| dka.example.com | A | IP address of dka.example.com |
| dka.example.com | MX | web address of DKA's mail server |

END-TO-END EMAIL ENCRYPTION USING A PUBLIC KEY DISTRIBUTION FRAMEWORK

CROSS-REFERENCE TO RELATED APPLICATIONS

This application claims the benefit under 35 U.S.C. § 120 as a divisional of U.S. patent application Ser. No. 18/241,959, filed on Sep. 4, 2023, titled "Public-Key Distribution Framework," which is incorporated herein by reference in its entirety. U.S. patent application Ser. No. 18/199,965, filed May 21, 2023, naming the same inventor and commonly owned by Applicant, is subject to the prior art exclusion under 35 U.S.C. § 102(b)(2)(C). Applicant hereby submits a Rule 130 declaration consistent with the declaration filed in the parent application.

FIELD OF INVENTION

This invention is in the fields of public key cryptography, Internet infrastructure, electronic mail, and electronic authentication.

BACKGROUND

Public key cryptography forms the basis for secure communication across the Internet and the idea of a Public Key Infrastructure (PKI) has been around for a long time. Yet, there are no well-defined mechanisms for the distribution and lookup of users' public keys such that a web resource or another user can initiate encrypted communication with a given user.

Bits and pieces of a solution to the distribution of user public keys exist in different proposals and solutions. The idea of a Public Key Infrastructure (PKI) proposes a Registration Agent (RA) that assigns IDs (identifiers) to entities and Certificate Authorities (CA) that issue certificates certifying the binding between an ID and its public key, and some kind of a centralized repository for hosting such certificates. The latter has never materialized as each CA tends to host certificates that it issues. Further, since an issued certificate can be later revoked by a CA, one also has to consult a Validation Authority (VA) to ensure that a certificate is still valid. Needless to say, no PKI for users has ever emerged.

s/Mime (Secure/Multipurpose Internet Mail Extensions) and OpenPGP (Pretty Good Privacy) are both solutions for encrypted email. In s/Mime, a CA (typically an enterprise) certifies the binding between an email ID and a public key; in OpenPGP, email IDs certify each other in webs of trust, but neither of these solutions has a well-defined key distribution or key lookup mechanism. s/Mime, which has found the most traction with corporate email, tends to store users' certificates in corporate email directories; OpenPGP users can upload their PGP certificate to one or more open-source directories, hoping that a sender can find it.

Given that email IDs are no longer just for email but have become de facto IDs with which people sign into applications ranging from corporate, social media, instant messaging, banking, government, eCommerce, crypto wallets, and so forth, a public key framework for the email ID namespace has a wide range of applications in encrypted email, instant messaging, user authentication, crypto wallets and so forth.

BRIEF DESCRIPTION

A domain, through a DNS (Domain Name System) record, designates a Domain Key Authority (DKA) that stores and serves the public keys of email IDs belonging to that domain. Since the DKA derives its authority from the domain through the DNS and the DKA guarantees the association between an email ID belonging to the domain and its public key, the DKAs, collectively, serve as a distributed public key framework for the email ID namespace.

FIG. 01 shows the DNS entries of a domain example.com, and FIG. 02 depicts the same DNS entries pictorially. The A record and the MX record specify the addresses of the domain's website and email server, respectively. The TXT record specifies the URL (Universal Record Locator) of a website and designates it as the DKA of the domain. The second A record specifies the address of the DKA website.

Figure 3:
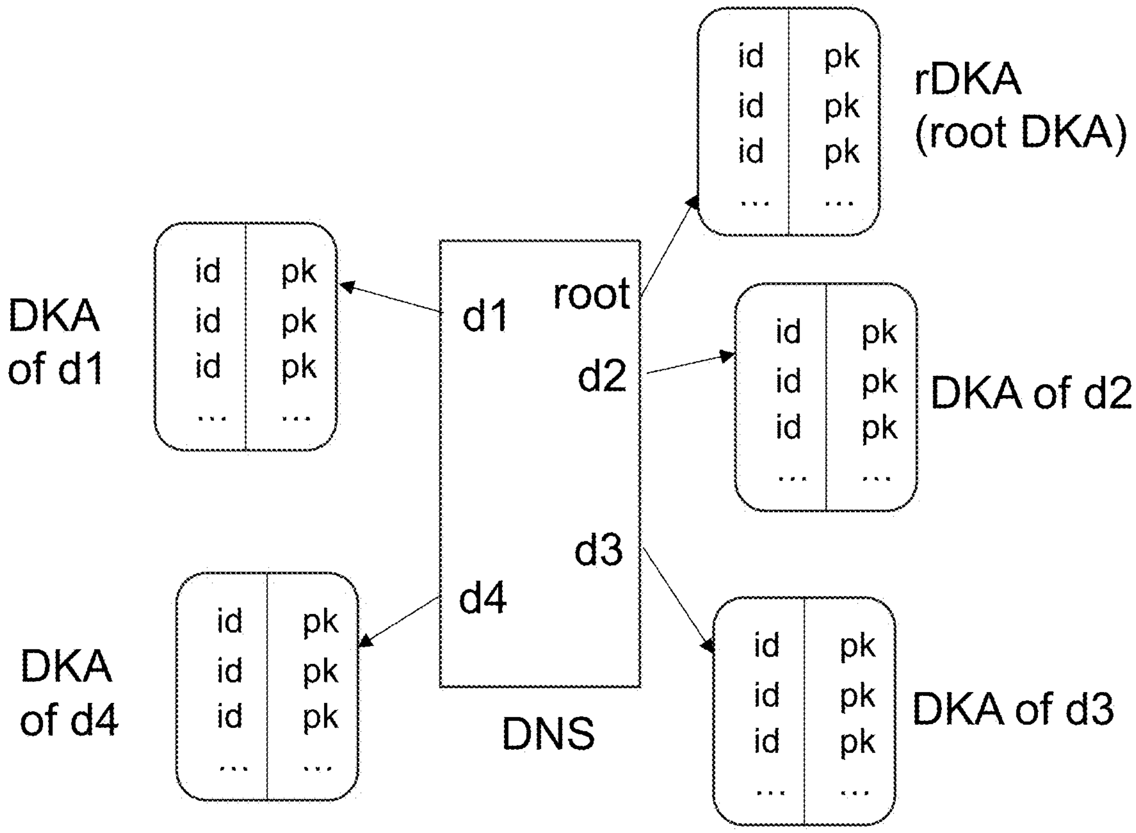

FIG. 03 shows how the DKAs of different domains collectively create a public key framework for the email namespace. Different domains specify the locations of their respective DKAs, and each DKA provides the public keys of email IDs belonging to that domain. alice@d1 can look up the public key of bob@d2 in d2's DKA in order to encrypt a message to bob@d2. Alice can also sign the message to Bob with her private key, and Bob can authenticate Alice's signature with Alice's public key in d1's DKA. The message can be an email that Alice wants to send to Bob, a challenge message for Bob to prove his identity by decrypting the message, or a message through which Alice and Bob initiate a key exchange protocol to establish some kind of a session key for, say, an instant messaging session using a protocol such as Signal or MLS (Messaging Layer Security). There is no need for Alice or Bob to authenticate with any third party, such as an Authentication Server, or rely on a blind "Trust On First Use" model.

We also define a special root DKA or rDKA that hosts and serves the public key of any email ID irrespective of its domain, with the proviso that a DKA for the domain to which the email ID belongs can override the root DKA. The rDKA can serve as a wildcard DKA for domains without their own DKAs or an alternate location from which a user can distribute his/her public key.

DKAs guarantee the association between an email ID and its public key by leveraging the email framework's own addressing and routing schemes. To register its public key with its DKA (or rDKA), an email ID must email the public key to the DKA from its own email account. If the incoming email is DKIM-authenticated, then the DKA can verify the sender to guarantee the association between the sender's email ID and its public key; if the email is not DKIM (Domain Key Identified Mail) authenticated, then the DKA sends a return email to the sender with an authorization code, and the sender must resend the public key with the authorization code to the DKA to verify that the sender of the email and the one who has control of the mailbox corresponding to the email ID are one and the same. The verification scheme can even involve the private key such as requiring the user to sign the verification code with the private key.

An immediate application of a public key framework for email ID is encrypted email. In this document, we describe an encrypted email system we call Keymail. Through Keymail clients, Keymail provides end-to-end email encryption with no change to existing email servers. In fact, by leveraging the rDKA, a Gmail user and an Outlook user can exchange encrypted, digitally signed messages without the need for certificates or webs of trust.

A second application that can leverage a public key distribution framework is user authentication without the need for passwords or third-party authenticators. In this document, we describe an authentication solution where a user can log into a website or an application simply with an email ID and without any password. Since the email ID's public key is known, the application or the website issues a challenge—a random phrase encrypted with the user's public key—and if the user can respond with the (decrypted) challenge phrase, then the user can be authenticated as possessing the private key corresponding to the public key.

Another area of application for a public key framework is the world of cryptocurrencies or so-called Web3. Web3 is fully encrypted, whereas the Internet is not encrypted at the user level. Our framework, by providing publicly available public keys for users, provides a bridge between the two worlds. We describe how our framework can be used to define a crypto-wallet and provide symbolic names for (crypto) payment addresses without the need for extra machinery such as those provided by the Ethereum Name Service (ENS).

LIST OF FIGURES

FIG. 01: DNS entries of an example domain showing how DKAs are defined.

FIG. 02: A pictorial view of the DNS entries shown in FIG. 01.

FIG. 03: A schematic showing multiple DKAs along with the root DKA (rDKA).

Figure 4:
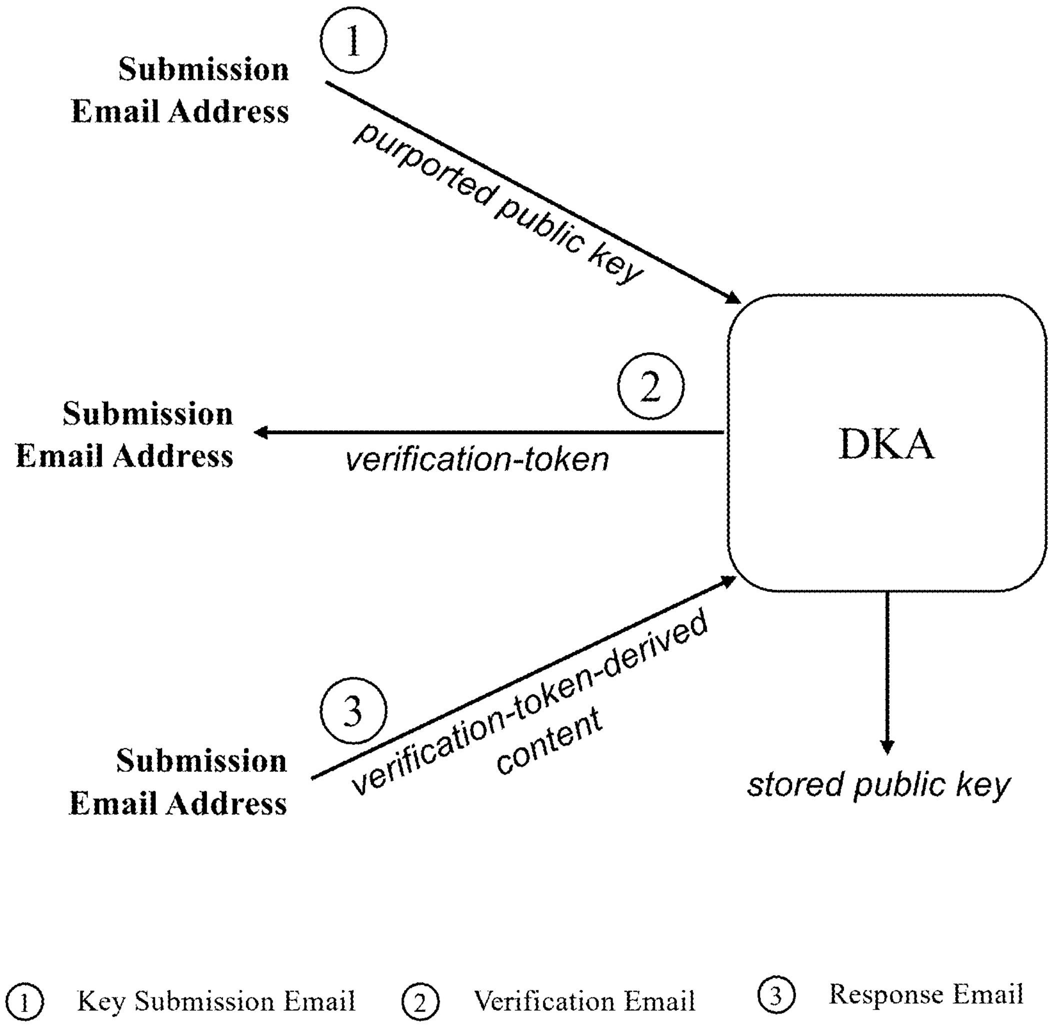

FIG. 04: A pictorial depiction of an email authentication step performed by a DKA.

Figure 5:
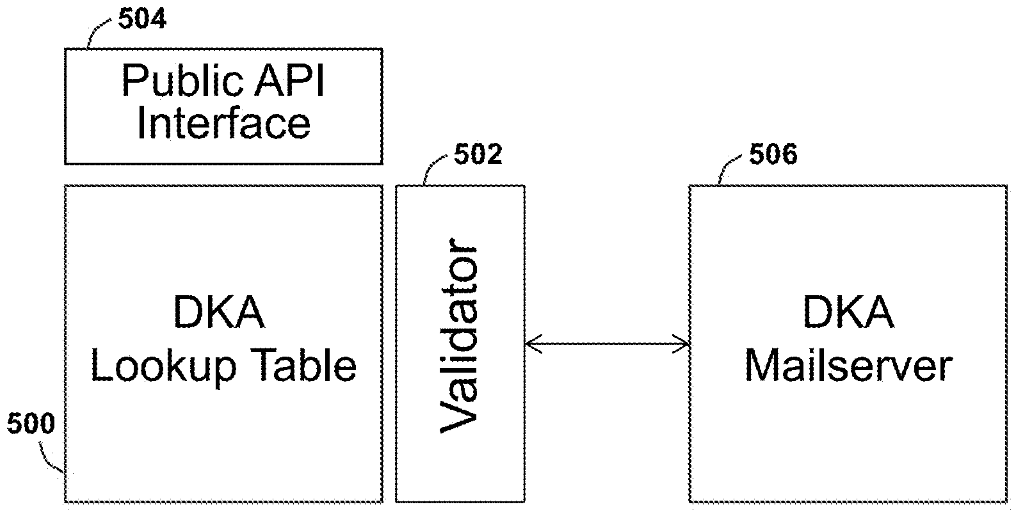

FIG. 05: A schematic depicting the high-level architecture of a DKA.

Figure 6:
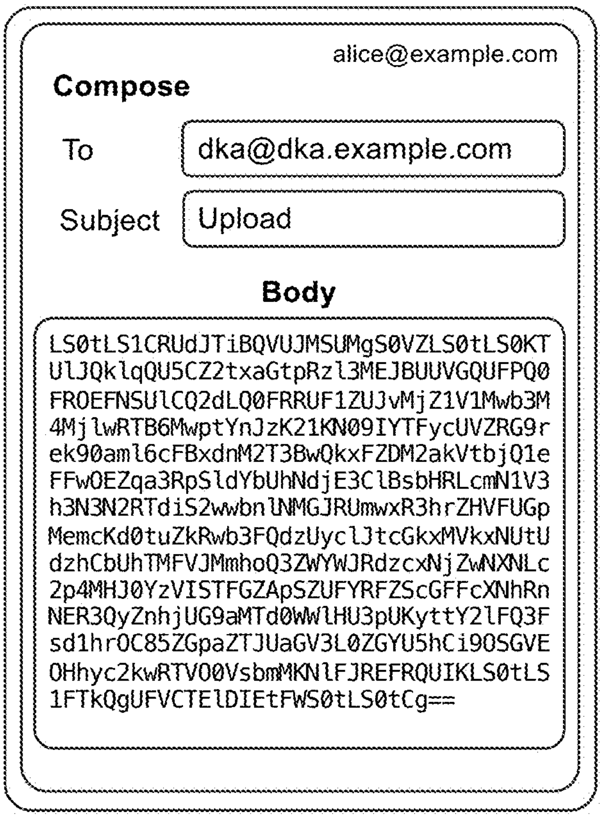

FIG. 06: Screenshot of a user sending a public key as an email to the DKA.

Figure 7:
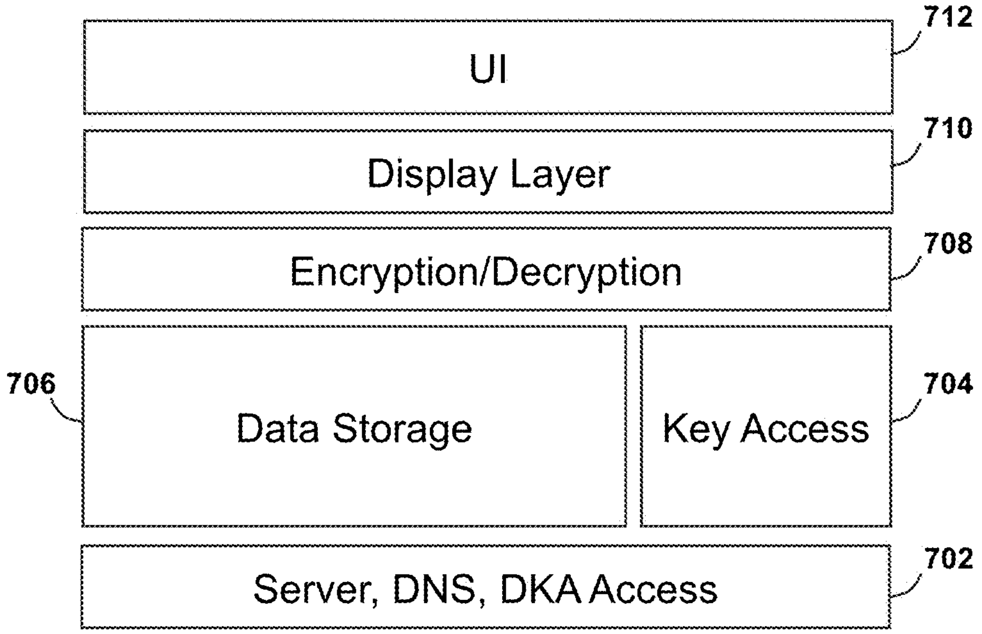

FIG. 07: A schematic depicting the high-level architecture of a Keymail client.

Figure 8A:
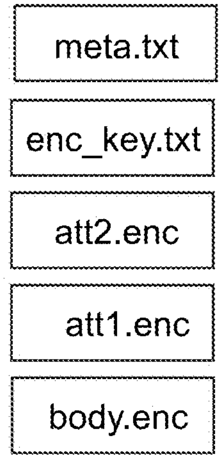

FIG. 8A: A data format used by a Keymail client to send encrypted email.

Figure 8B:
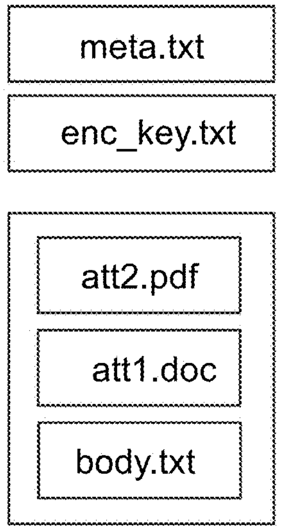

FIG. 8B: Another data format used by a Keymail client to send encrypted email.

Figure 8C:
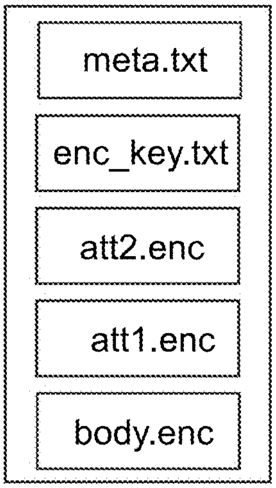

FIG. 8C: Another data format used by a Keymail client to send encrypted email.

Figure 9:
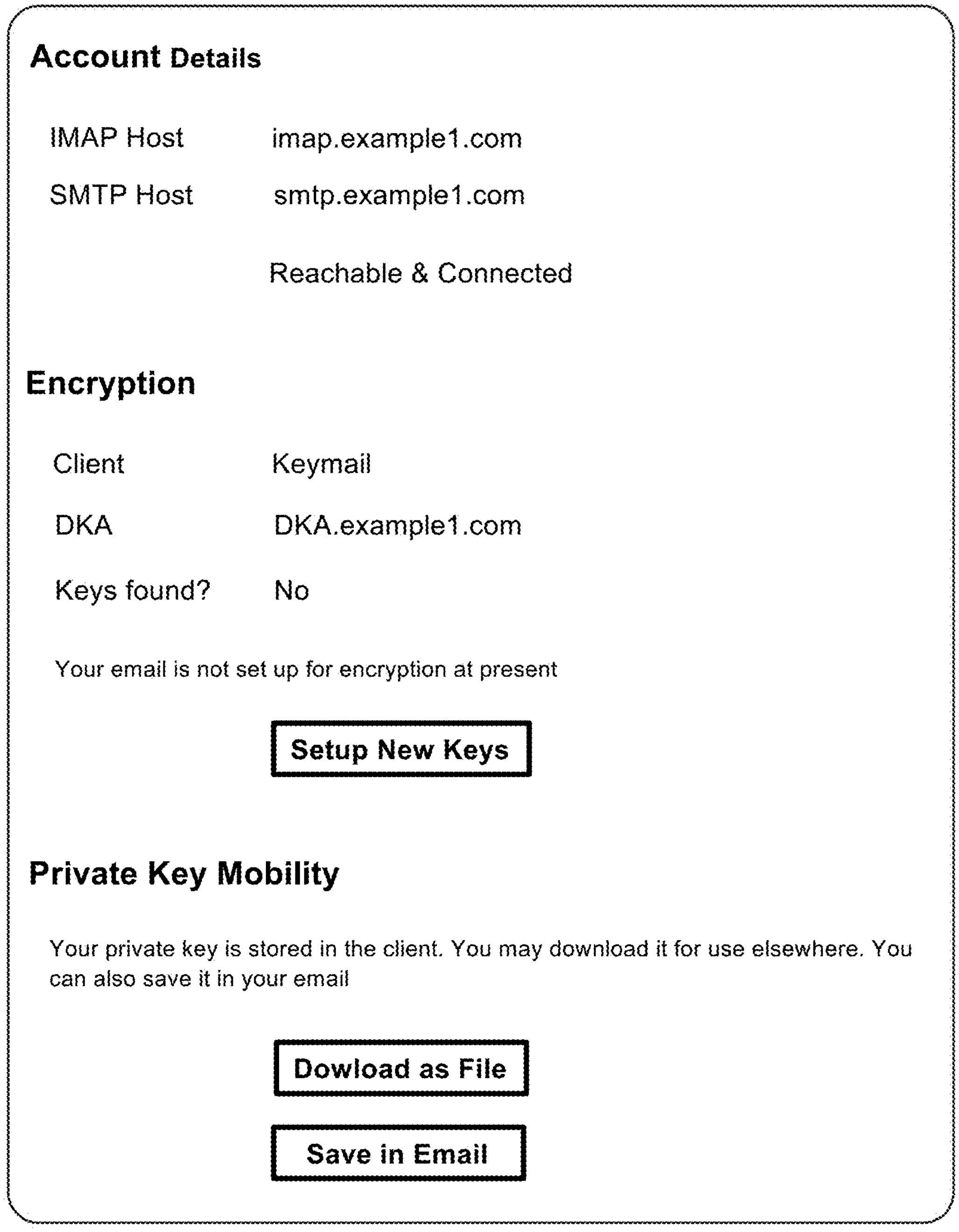

FIG. 09: Screenshot of a Keymail client showing how users set up encryption keys.

Figure 10:
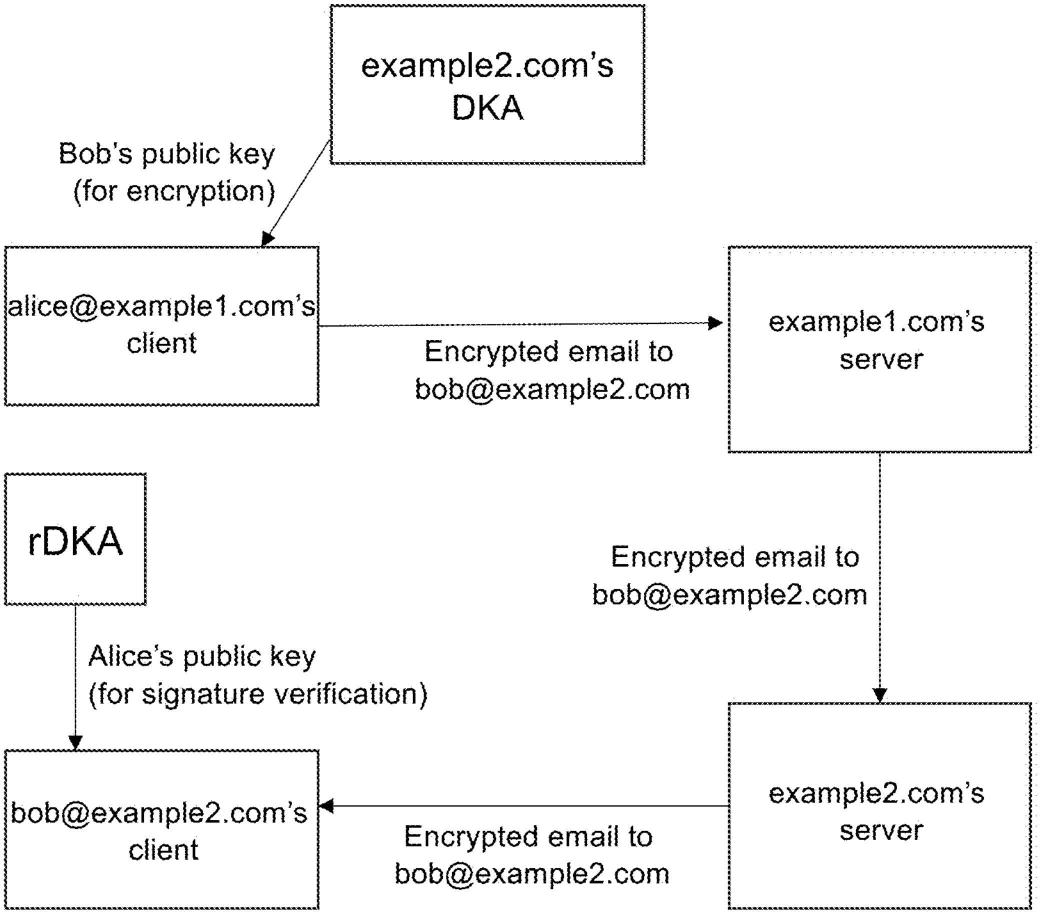

FIG. 10: Schematic of how an encrypted, signed email is sent and received.

Figure 11:
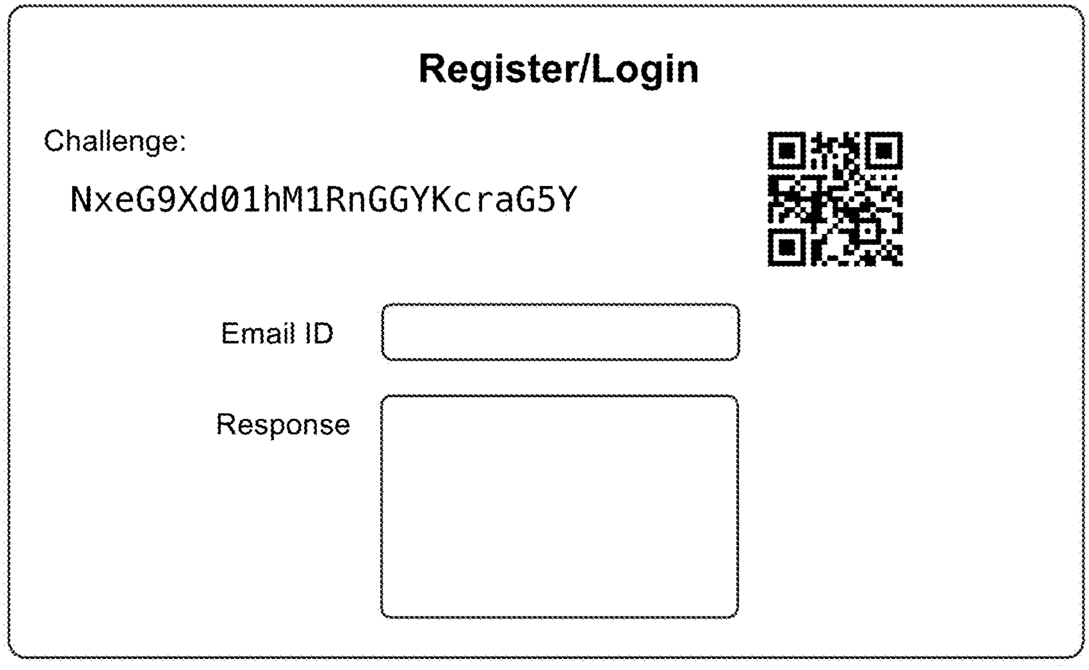

FIG. 11: An application's login screen with a challenge and requesting a response.

Figure 12:

FIG. 12: Screenshot of a simple challenge-response authenticator app.

Figure 13:
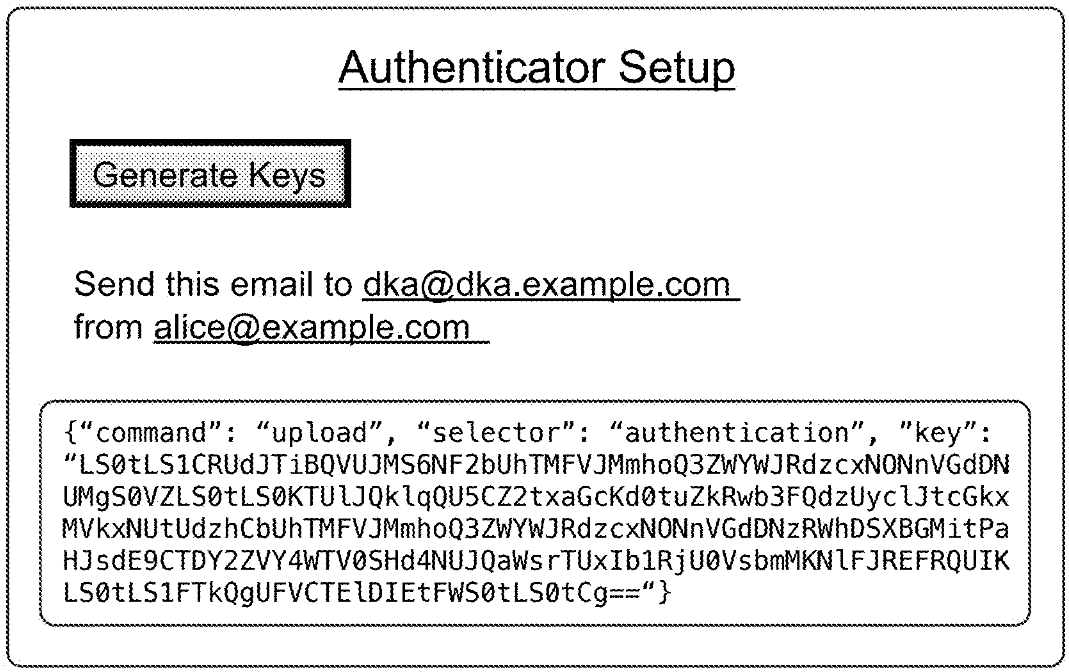

FIG. 13: An authenticator application's initial setup screen.

Figure 14:
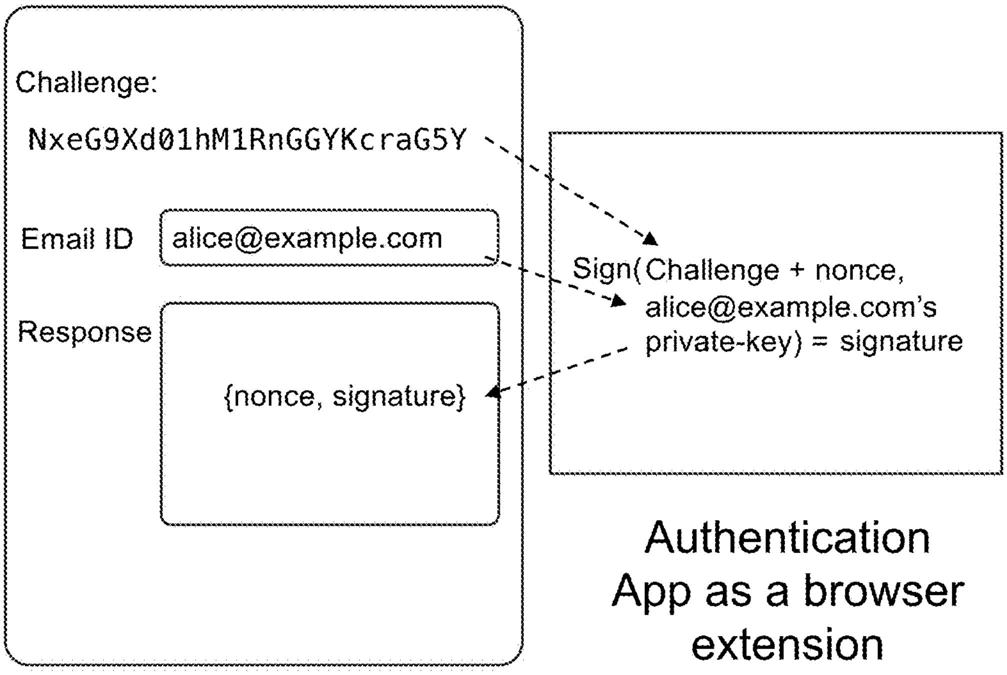

FIG. 14: Dataflow in an authenticator app as browser extension.

Figure 15:
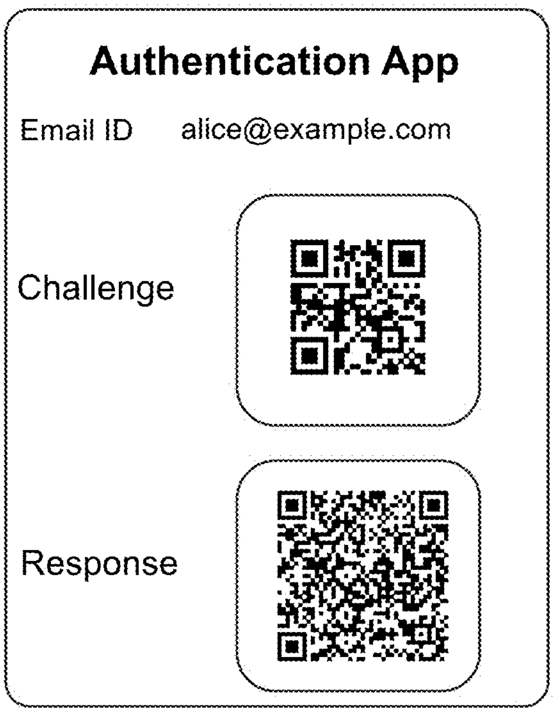

FIG. 15: Screenshot of a QR code authenticator app.

Figure 16:

FIG. 16: Screenshot of a payment request from a crypto wallet CW.

DETAILED DESCRIPTION

We now describe a public, distributed, and decentralized framework for the distribution and discovery of public keys of email IDs. This framework may be seen as a public key infrastructure, but we refrain from using that term as it has been associated with the PKIX (Public Key Infrastructure X.509) working group of the IETF (Internet Engineering Task Force) and X.509 standards. Instead, we will continue to refer to it generically as a framework.

Throughout this document, we use the terms public key and private key as they are normally used in asymmetric cryptography. These terms should not be construed to refer to any specific algorithm. Different DKAs or DKA versions may use different algorithms to generate these keys. This disclosure is aimed at describing a general framework for the distribution of such keys rather than favoring or prescribing any particular encryption algorithm.

At the heart of our public key framework are Domain Key Authorities (DKAs) that collect, store, and serve public keys of email IDs belonging to a given domain, except for the root DKA (rDKA) which may serve the public key of any domain.

A DKA is a website with its own mail server and is linked to the domain via a DNS record as indicated in FIG. 01. The first MX record specifies the web address of the mail server of the domain example.com. This is the mail server that handles emails of email IDs of the form xyz@example.com. The second MX record specifies the web address of the mail server supporting the DKA. This mail server deals with email addresses of the form xyz@dka.example.com. The TXT record specifies that it is defining the DKA of the domain example.com and the URL in the TXT record specifies the web address of the DKA. This record may optionally specify a version number (e.g., DKA1) to indicate that this DKA implements a given DKA version. The second A record specifies the physical location of the DKA. Since the mail server of the DKA is very simple with just one mailbox (as we will see below), it may often be collocated with the DKA in the same server. FIG. 02 is a pictorial depiction of the same DNS entries in FIG. 01. FIG. 03 shows how the DKAs of different domains collectively create a public key framework for the email namespace.

A high-level architecture of the DKA from one embodiment is shown in FIG. 05. It comprises a lookup table 500 for storing the public keys of email IDs and an email server 506 for receiving the said public keys via incoming emails. Validator 502 acts as the gatekeeper that ensures that a public key is in fact associated with its email ID. The DKA has a public API (Application Programming Interface) interface 504 through which one can request a public key of an email ID belonging to the DKA's domain (except with rDKA, which can serve the public key of any domain).

An Email ID installs its public keys in the DKA by emailing it to the DKA from the email account of the said email ID (submission email address). The email typically has the command "upload" as its subject and the public key in its body; alternatively, the command and the public key may be a JSON (JavaScript Object Notation) string in the body (or in any other form standardized by the DKA). An email ID belonging to the domain example.com (i.e., xyz@example.com) may install its public key in the DKA of example.com or in the root DKA (rDKA).

The email server 506 typically has one mailbox (e.g., dka@dka.example.com) for receiving incoming email. In order to establish the identity of the sender of the email, Validator 502 can perform two validation checks, and an embodiment may perform one or both. The first check is the standard DKIM (Domain Key Identified Mail) check that checks if the email's metadata has been correctly signed by the sending domain with the DKIM key that is specified in the sending domain's DNS records. The second check is to verify if the sender owns its email ID (submission email address) by sending a return email to the sender with a random authorization code or verification token. If the sender can resend the email along with the authorization code within a stipulated time interval, then the sender's email ID can be considered validated. FIG. 04 provides a pictorial depiction of this email validation or authentication step performed by a DKA. The Validator 502 then extracts the public key from the body of the email, performs integrity checks on the public key to ensure that it is a valid public key, and stores it in the lookup table 500 as a public key of the sender's email ID. The public key may be in any standard form for public keys. Some embodiments may accept other entities than public keys. FIG. 06 shows a user sending one's public key to a DKA.

The root DKA is the DKA of the domain designated and publicized to be the "root" domain of the framework. For example, the root domain could be defined to be rootdka.org and dka.rootdka.org could be designated by rootdka.org as its DKA. We will symbolically refer to the root DKA as rDKA. The rDKA is similar to any other DKA, except it accepts public keys of email IDs belonging to any domain, ensuring that the email ID is validated properly.

All DKAs provide a public API and API interface 504 by which the DKA can be queried for the public key of an email ID. The lookup table is searched and if the email ID is found with an associated public key, then it is returned.

The rDKA, when given an email ID, first checks the email ID's domain's DKA for a public key for the email ID. If one exists, it is returned. If not, the rDKA searches its own lookup table to see if there is a public key for the email ID. Alternatively, the rDKA can follow the convention that the very existence of a DKA for a domain overrides the rDKA for all email IDs belonging to that domain. In either case, to look up the public key of an email ID, a shorthand is to ask the rDKA. The rDKA will return a public key from the domain's DKA if one exists; if not, it will return one from the rDKA if the rDKA is not overridden.

A distinguishing feature of this public key framework is that it is highly deterministic: there are at most two places (the domain's DKA and rDKA) where an email ID's public key could reside and the absence of a public key in both places is enough to conclude that the email ID does not have a public key. This is in contrast to OpenPGP and s/Mime, where the public key of a user could reside in any number of places; if one is found, the finder cannot be sure it is the latest; if one is not found, the finder cannot be sure that a key does not exist.

DKA Enhancements

Thus far, we have described the basic features of a DKA-based public key framework that provides a distribution and lookup mechanism for email IDs. We now discuss some enhancements to the basic framework.

Multiple Public Keys: An email ID can have more than one public key associated with it, with each key having a different label or selector. There can be one default public key (for when no selector is specified), one for email encryption, one for instant messages, one for authentication, one or more to serve as addresses for crypto wallets, and so forth. The advantage of multiple keys with selectors is that their corresponding keys may generated and owned by different applications that deal with different functionalities and different levels of security; if one is compromised, it can be replaced without affecting others. A useful analogy for a selector is to think of it as similar to a 'port' in network communication.

Certificates: Many Internet standards require not just a public key, but a certificate issued by a Certificate Authority certifying the binding between the public key and the email ID. If this is deemed necessary, a DKA can become a certificate authority (CA) or an intermediate CA itself and sign the public keys in the DKA since it has already verified the binding. In response to an API request, the DKA can return a certificate instead of, or in addition to, the public key of an email ID. In this case, our public key framework can become a full-fledged PKI issuing X.509 certificates to email IDs.

Levels of Verification: The basic DKA receives public keys by email and accepts the verification of the sender's email ID as the basis for certifying the binding between the public key and the email ID. This may be deemed inadequate authentication of email ID by certain applications. DKAs may use a cascaded set of authentication techniques: two-factor authentication via SMS (Short Message Service), TOTP (Time-based One-Time Password), or other means, social verification by requiring a user to post the public key on social media and linking the user ID to the social media profile, or even out-of-band (i.e., a non-electronic means) authentication. A DKA may also receive public keys via authenticated APIs from either the domain itself or from another application that can vouch for the public keys of the email IDs. DKAs may use different version numbers and/or metadata (see below) to indicate how the user's ownership of the public key was verified as well as the additional data fields/features that a DKA supports.

Metadata: Besides a selector, a public key can also have a set of properties as key-value pairs. These could include, among other things, attributes of the key such as key length, the name of the algorithm used to generate the key, a key fingerprint, key expiration date, and so forth. In some embodiments, these properties are referred to as metadata and carried in a JSON string.

Associated Data: In some cases, instead of a public key, a proxy for a public key may be used. This is particularly useful for crypto wallets which can place, say, a Bitcoin address (which is a hash of a public key) as the receiving address associated with a recipient identified by an email ID. Although the proxy cannot be used to encrypt a message to the user with the email ID, the proxy serves as the name for a public key through which a cryptocurrency payment may be sent to a blockchain.

Key-Value Pairs: Additional features of the DKAs must also be supported by the DKA's email server so they can be easily input via the email server. One simple approach is to define 'commands' that can be embedded in the subject of an email to the DKA such as upload, modify, and delete. With upload, a public key and all its various attributes may be specified in the body of the email as follows:

[{"selector": selector, "key": key, "certificate": certificate, "meta": {key: value, key: value . . . }]

The modify command would have the same format as above and if a key with the specified selector is found, all its fields would be modified. The delete command is self-explanatory.

Public vs. Private Data: The DKA may be seen as a public lookup mechanism for information about an email ID and the metadata field allows the possibility of storing and serving arbitrary information through the DKA (e.g., the user's age, gender, picture, etc.). Some versions of DKA may add a second protected metadata field that might be used to store information whose access is restricted to certain parties via passwords or other means.

The API Interface 504 must also provide the ability to retrieve keys and/or certificates based on the selector and other attributes. Some examples of APIs supported by 504 could be the following: get-public-key (retrieves public key given an email ID), get-public-key-with-selector (retrieves public key given an email ID and a selector), get-selector-data (given an email ID and a selector, get all data of that email ID associated with that selector), get-selectors (given email ID, get all selectors of that email ID), get-version (get DKA's version), api-list (list all APIs supported by the DKA) etc.

Throttling: In order to prevent spammers from trying to dump all email IDs from a DKA, the API Interface 504 may use throttling and blacklisting to deny access to suspected miscreants.

DKA Structure and Versions

This document is not meant to be a standards definition but a description of an invention. However, for a public framework to function, each DKA cannot be idiosyncratically different. We propose that features be grouped into versions of DKAs and reference implementations of different versions of DKAs be open-sourced. The DNS record can specify which version is implemented by a given DKA. Open-sourced DKAs will make it easy for domains to quickly implement their DKAs as well as increase the confidence in the integrity of the DKA framework.

1. Encrypted Email

We now describe an email system that leverages the public key framework above to provide end-to-end email encryption and authentication. In this document, we refer to our email system as Keymail. Keymail is compatible with current email standards: specifically, Keymail can interoperate with regular email and the Keymail client can provide authentication and encryption for existing email systems. For example, a Gmail user and an Outlook user can send each other end-to-end encrypted emails by using their Keymail clients.

Keymail comprises an email server and the Keymail client. Any email server supporting standard email protocols (e.g., SMTP or Simple Mail Transfer Protocol, ESMTP or Extended Simple Mail Transfer Protocol, IMAP or Internet Message Access Protocol, etc.) can serve as the Keymail server of a domain. In other words, every standard email server, by default, also supports Keymail. This statement is meant to emphasize that Keymail can work without needing any change to an existing email server and should not be construed to mean that a Keymail implementation is predicated on a standard email server. Some or all of the functionalities of DKA and/or the Keymail Client may be implemented in the server if appropriate.

1.1 Keymail Client

A Keymail user uses the Keymail Client to send and/or receive emails. Here we will describe an embodiment of the Keymail client that is used for both sending and receiving while noting that sending and receiving could be provided by two distinct applications if necessary. We will assume that the client works with a standard email server that uses SMTP and IMAP protocols for mail transfer and mail delivery. Since SMTP and IMAP are the most common, our examples and embodiments invoke them but that should not be construed that Keymail is in any way dependent on any specific email protocol.

FIG. 07 depicts a high-level technical architecture of an embodiment of the Keymail client that supports both sending and receiving email from an email server. The client can be a local application on a user device or could run on a cloud server, providing UI (User Interface) access to the user. Layer 702 supports network access, specifically for the client to access email servers, the Internet's DNS, and DKAs. Given a user's credentials, this layer may access the user's mailbox on the server for incoming email and send outgoing email by authenticating itself either via passwords, app passwords, and/or OAuth, all of which are well-understood in the art.

704 provides secure access to the user's private keys. The keys may be stored in the client or may be stored securely elsewhere. In some embodiments, access to these keys may be controlled by a user password. Since a user can have multiple email IDs and a given email ID can have multiple public keys with different selectors, a user can have multiple private keys. A useful convention for naming private keys is a combination of the private key's email ID and the public key's fingerprint.

706 stores some or all of the contents from the user's email folders. In some embodiments, the contents from mail folders are fetched from the server, stored temporarily, and decrypted on demand to display on the UI. In other embodiments, the contents are fetched, decrypted, and saved in the decrypted form in client storage to avoid repeated decryption. Either strategy (or some mixture thereof) is consistent with the concept of end-to-end encryption, though with different performance and client-level security implications.

708 deals with the encryption and decryption of emails in Data Storage 706. Outgoing emails would be encrypted with the public key of the recipient (obtained by the DKA Access part of 702) and incoming emails would be decrypted by the private keys of the user (stored in Key Storage 704). If an embodiment also signs outgoing emails and verifies the signature of incoming emails, then the outgoing emails would be signed with a private key of the user and the signature on incoming emails will be verified using the public key of the sender.

The display layer 710 provides an abstraction layer between the actual user interface and the rest of the client. This enables the client to be either a local application communicating with a local UI or a cloud-based application communicating with a browser-based UI. In either case, 712 represents the UI.

To understand the functionality of the client, let us assume that the domains example1.com and example2.com have been set up with standard email servers and these domains have DKAs at dka.example1.com and dka.example2.com respectively. Let us also assume that Alice and Bob have just signed up with these domains with email IDs alice@example1.com and bob@example2.com respectively.

1.2 Sending Keymail

Imagine that alice@example1.com wants to send an email to bob@example2.com. She can compose the email as she would with any email client. When she tries to send the email, Alice's Keymail client looks at the DNS records of example2.com to locate a TXT record that specifies a DKA for the domain. Since example2.com has a DKA at dka.example2.com, Alice's client requests this DKA for the public key of bob@example2.com. Since Bob's account is new and he has not set up his keys, no keys are found and the client sends Alice's email (say, via SMTP) as any other email to bob@example2.com. [For the sake of this example, let us assume that Bob does not have a public key in his domain's DKA or rDKA].

Let us now assume that a public key for bob@example2.com is found. In that case, the client creates a random encryption key of sufficient length (typically 256 bits or higher) called a symmetric key and uses that to encrypt the contents of the email composed by Alice. Then the client encrypts the symmetric key with Bob's public key and sends the contents and the encrypted symmetric key to the recipient bob@example2.com. The precise file structure of the contents can be different in different embodiments, with three examples shown in FIG. 08A, FIG. 08B, and FIG. 08C. In FIG. 08A, the body and each of the attachments are encrypted with the symmetric key as three distinct files. The encrypted key itself is set in a fourth file, all of which are sent as attachments to an email. In FIG. 08B, the body and attachments are consolidated into a zip file and, the zip file is encrypted with the symmetric key and then the symmetric key is written to a second file, and both files are emailed to the recipient. FIG. 08C is similar to 08A, except that rather than sending multiple files, 08C consolidates them into a single zip file that also includes a file map that provides meta-information about the files in the zip file. In all cases, a meta.txt file provides a file directory and other useful meta information for the recipient.

Although it is technically possible to encrypt all the content directly with the public key, asymmetric encryption and decryption are very inefficient. It is customary to use a random symmetric key to encrypt the content and then encrypt the symmetric key with the public key. The receiver first decrypts the encrypted symmetric key with its private key and the symmetric key is then used to decrypt the content. These are well-known and well-established techniques in the field of encryption.

1.3 Receiving Keymail

Assume that bob@example2.com receives an email from alice@example.com. If the client through which the email is received is a standard email client, all that Bob will see are one or more zip and/or encrypted files such as those in FIG. 08A, 08B, or 08C.

In contrast, a Bob's Keymail client would recognize that the email is encrypted (based, say, on metadata), look at Bob's stash of private keys, and see if any one of them will decrypt the encrypted symmetric key. If so, it obtains the symmetric key by decrypting the encrypted symmetric key with the private key. Once the symmetric key is obtained, decrypting the rest of the contents, and displaying them to the user is straightforward and well-understood.

As stated earlier, an embodiment may decrypt an email afresh every time it is accessed or decrypt it once and store it in 706 in its decrypted form. This behavior may be controlled by a user preference setting depending on the user's need for security and privacy.

1.4 Setting Up the Cryptographic Keys

An extremely security-conscious user may generate their public and private keys themselves using a key generation utility. The user can then manually email the public key from the email account to the DKA and store the private key with the client possibly encrypted with a password. However, the typical use case is that the Keymail client would be an application under the user's control—either locally on the user's device or on a cloud server under the user's control—and would therefore be trusted. A client can therefore automate the key setup process.

In one embodiment, the Keymail client simply provides a button for a user to click in order to set up one's keys. Let us assume that Alice has just signed up for her email account as alice@example1.com. She opens her Keymail client and inputs her login credentials for her new email account. Then she clicks on the button to set up her cryptographic keys. The Keymail client would generate a public and a private key pair, store the private key in its Key Storage 704, notice that the domain example1.com has a DKA at dka.example1.com, and email the public key from her email account alice@example1.com to dka@dka.example1.com. On receiving the email, the DKA will validate the sender of the email, and then install the public key in the DKA as the public key of alice@example.com.

Suppose example1.com does not have a DKA. The client would then email the public key from alice@example1.com to rDKA (say, dka@dka.rootdka.com). The root DKA would validate Alice's email address and then install the public key in rDKA's lookup table as the public key of alice@example1.com.

1.5 Signing Outgoing Email

Assume that both alice@example1.com and bob@example2.com have set up their public keys in their respective DKA. Since Alice can access Bob's public key, Alice can encrypt emails addressed to Bob that can only be decrypted using Bob's private key. Since Bob has access to Alice's public key, Alice can also digitally sign the message with her private key, which Bob can verify using Alice's public key.

We illustrate the signing and signature verification from one embodiment that uses the file structure shown in FIG. 08B, where Alice creates a zip file containing the contents of the email and encrypts it with the symmetric key to generate contents.zip.enc. She now generates a hash with hash(contents.zip.enc), as a digest of the encrypted zip file which she signs by encrypting the hash with her private key. This forms her signature, which she sends as part of the meta.txt:

{"signed-by": alice@example1.com", "signed-with": public-id-fingerprint, "signature": signature}

On receiving the message, Bob can verify Alice's signature by decrypting the signature with Alice's public key from example1.com's DKA and comparing it with a hash of the received contents.zip.enc file. If they match, Bob can be sure that the contents were sent to him by Alice. As long as the recipient has the sender's public key, different conventions for signing a document and what to use as a digest can be designed.

Note that, from an encryption/decryption standpoint, an email ID can change its public key as often as it wants as long as it retains all its private keys or stores received emails in their decrypted form in its client. The longevity of a public key comes into question only if the key is also used for signing outgoing emails. In some embodiments of DKA, an email ID may use one long-lasting public key exclusively for the purpose of signing outgoing email (with a selector, say, 'signing-key') which recipients can use to verify the email ID's signature. With a separate 'signing-key', the email ID can change its default encryption key whenever it wants.

1.6 Sending to Multiple Senders

Assume that alice@example1.com wants to send a message to multiple recipients. Let's assume that all recipients have a public key specified in their respective DKAs. A simple approach is to send separate encrypted copies to each recipient. A more elegant and efficient solution is to send a single copy of the email to the server with the content encrypted as in FIG. 08B with a symmetric key. The enc_key.txt, however, can specify multiple encryption keys where each key is the symmetric key encrypted by the public key of a different recipient:

[{"recipient": "r1@d1", "enc_key": "key1"}, {"recipient": "r1@d1", "enc_key": "key1"} . . . ]

The recipient's client can take the encrypted symmetric key corresponding to its user, decrypt it to obtain the symmetric key, and then decrypt the content with the symmetric key.

1.7 Private Key Mobility

The client can be a local application running on a device, storing private keys in the client device. For users who want to use their email from multiple devices, there must be a way to transport the keys between devices. An embodiment of the Keymail client can store a copy of the private key as an email within the mailbox itself, encrypted with a password controlled by the user. The user can then access encrypted email from any client on any device by decrypting the private key (stored in the mailbox) with the user's password and using the private key for accessing the encrypted content in the mailbox. Alternatively, the user can also run the client in one's own cloud and have access to it as webmail from anywhere.

1.8 Keymail: Conclusion

Keymail has two major differences and advantages over current email encryption techniques such as s/Mime and OpenPGP. Keymail users do not need third-party validation of their public keys via Certificate Authorities or webs of trust. Second, unlike s/Mime and OpenPGP, Keymail is based on a clear public key distribution and lookup framework. Anyone can send an encrypted email to anyone by simply looking for the latter's public key in rDKA (which will look up the key first in the email ID's domain's DKA before rDKA). As such, the public key framework and Keymail leverage the trust model of the domain system itself to establish the binding between an email ID and the public key and leverage the domain system itself to look up the location of the DKA to distribute and discover the public keys. The public key lookup scheme is specific and deterministic: it only needs to look for the recipient's public key in two places and if not found, it can conclude that no key for the recipient exists.

FIG. 09 shows a screenshot from an embodiment of the Keymail client, enabling a user to create a key pair as well as to make the private keys mobile. FIG. 10 shows the dataflow involved in alice@example1.com using a Keymail client to send an encrypted and signed email to bob@example2.com. For this example, let us assume that example1.com does not have a DKA and example2.com has a DKA. Alice encrypts the email using Bob's public key in example2.com's DKA to create an email with file attachments as in say FIG. 8B, signs it with her private key, and sends it to example1.com's mail server, which sends the encrypted email to example2.com's mail server. The email, being encrypted, simply consists of metadata and unintelligible enclosures. When Bob retrieves the email from his Keymail client, he can use his private key to decrypt Alice's email and Alice's public key in rDKA to verify her signature.

2. User Authentication without Passwords

To authenticate users, computer applications routinely use a login or authentication system. During the registration phase, the user provides an identity (username) and stores a shared secret (password) with the authentication system. Later, to be logged in, the user has to reproduce the same shared secret, and the authentication system "authenticates" the user to the application as the one with the given identity.

In contrast, a publicly accessible public key framework for users' email IDs provides a very different approach to user authentication. To understand this approach, it is useful to visualize the public key framework as a fabric that covers the Internet, where a part of everyone's identity (the public key) is laid bare for anyone to access. The rest of the user's identity (the private key) is in the user's possession and both parts have to come together for the user's identity to be revealed. Hence, in order to authenticate a user, all that an application needs to do is to create a challenge involving the public key. If the user can respond to the challenge by demonstrating that the user has possession of the private key, then the user can be considered identified or authenticated. In this paradigm, there is no registration phase since the user does not first store a shared secret with the application. The application can create a user account on the first login and does not have to maintain a password database or handle password resets, impose password rules, etc. since no part of the user's identity is stored in the application. A user does not have to remember hundreds of passwords or worry about stolen passwords.

Conceptually, key-based authentication is quite simple. When a user, say, alice@example.com, wants to authenticate herself to a website, she enters her email ID in the registration/login screen of the website. The website offers her a random challenge phrase. She provides a response which is the challenge phrase signed with her private key and the website can use her public key to verify that it is in fact her signature and then authenticate her. In practice, Alice may add a random nonce to the challenge phrase before signing it in order to prevent any repetition attacks. Alternatively, the website can give her the challenge phrase encrypted with her public key and ask her to decrypt it to prove her identity.

To be sure, using a cryptographic keypair for authentication is not new. Secure Shell (SSH) login uses public-private key pairs for logging in from clients to servers. However, SSH is no different than the typical authentication system where a user stores a shared secret with the system during a registration process. In SSH, instead of a password, the user (typically a client) stores a public key with a server. The public key is the shared secret that enables SSH to log in the client into the server through a more sophisticated challenge than a simple password comparison. What distinguishes our login scheme is that there is no shared secret between the user and the authentication system. The shared secret is stored outside the authentication system in the public key framework. A simple test to distinguish SSH and the technique proposed here is this: can the user change the public key and still be authenticated? In SSH, if the user changes his/her public key, the user will no longer be able to log into the server. In contrast, in the technique disclosed here, the user can change one's public key in the DKA as frequently as the user wants and still be authenticated by any authentication system. In other words, in our technique, the entire identity of the user exists outside the authentication system and the authentication system can authenticate a user it has never encountered before. And that's the reason why there is no difference between registration and authentication.

Since there is no shared secret stored with an application's authentication system, applications and websites don't have to worry about password hashing, password theft, password reset, etc. All they have to do is generate a random phrase as a challenge, get a user response, and decrypt the response with the user's public key to see if it matches the challenge phrase. If the user also presents a nonce, then the website must add the nonce to the challenge phrase and compare it with the decrypted response.

If Alice's private keys are compromised or lost, she can simply create a new key pair and upload the public key to the DKA. With that one action, Alice can reset her "password" for every application that she'll log into.

In FIG. 11, an application presents a login screen with a challenge. The simplest embodiment of an authentication application, shown in FIG. 12, implements the challenge-response process described above. The user, alice@example.com, copies and inputs the challenge into her authentication application which signs the challenge with her private key. Now Alice can copy and paste this into the response field of the login screen to authenticate herself. This embodiment, although not practical from a usability standpoint, illustrates the basic process of key-based registration and authentication.

We will now describe an embodiment of an authenticator application that takes the challenge-response process behind the scenes in order to make registration/login much more user-friendly. This embodiment may be implemented, for example, as a browser extension for logging into websites, as part of the browser, and/or the Operating System. During the setup stage, the user, Alice, uploads a copy of her private key into the application. Alternatively, as shown in FIG. 13, she can also have the application generate a new public-private key pair with a selector such as "authentication". The extension stores the private key securely within the extension or in the file system and asks Alice to email the public key from her email account to the DKA. After this setup is complete, if she goes to a login screen such as FIG. 11 and enters her email ID, the extension automatically reads the challenge and her email ID, retrieves the private key corresponding to her email ID, adds a nonce (a random string) to the challenge and signs it with the private key. Then it automatically injects the nonce and the signature into the response field on the website to log her in. This process is shown in FIG. 14.

For some users, a QR (Quick Response) code authenticator, as shown in FIG. 15, may be particularly handy and easy. The app may have a similar setup or initialization process as in FIG. 13. The website or application (that the user wants to log into) displays the challenge as a QR code, which the user captures or pastes into an authenticator app, which generates a QR code response, which the user pastes back into the application or website to be authenticated.

One skilled in the art can imagine other variations of authenticators based on a challenge-response scheme based on public-private keys. The variations can be with respect to the kind of challenge issued and the response expected. Alternatively, the variations can also be in how the authenticator integrates into the user's workflow in order to make it more usable while retaining the same underlying idea: a challenge based on the user's public key from the public-key framework and a private-key-based response.

3. Crypto Applications

A public key framework for email IDs has many applications within the crypto ecosystem. Before we describe these applications, it is important to explain the rationale behind the relationship between a public key framework and the crypto world.

Traditional Internet or the so-called Web2 operates with familiar and convenient symbolic names for domains and people (email IDs). The crypto world or so-called Web3 operates with unfamiliar and cumbersome public keys and hashes for addresses and identifiers. The public key framework disclosed in this document systematically associates verified public keys bound to email IDs, thereby providing a bridge between the two worlds where all communication can be secure and encrypted. Contrast this with the emerging Ethereum Name Space (ENS), which requires one to replicate Web2-like symbolic names into the Web3 world.

A Crypto Wallet (CW)

Here we describe an embodiment of a crypto wallet CW that uses the public key framework for requesting, sending, or receiving cryptocurrency. Let us assume that alice1@example.com and bob2@example.com both use CW. For simplicity, let's further assume that their respective CWs have an OAuth connection to their respective email accounts so that their wallets can send emails directly from their respective email accounts to their respective DKAs. On initialization, both the wallets would create public keys in their respective DKAs with a selector, say, cw, a public key exclusively for encrypted communication with other CWs. CWs can now be identified by their email IDs and can have direct and encrypted communication with each other.

Setting a payment address: When Alice's CW creates or changes a payment address for a cryptocurrency (which is typically a hash of the user's public key in the underlying cryptocurrency blockchain), it can simply set this address in Alice's DKA with the appropriate selector. For example, a DKA entry for alice@example.com could read {"selector": "BTC", "address": "1A1zP1eP5QGefi2DMPTfTL5SLmv7DivfNa"}. Now anyone who needs to pay Alice can simply create a Bitcoin transaction from their wallet to this address without Alice having to resort to regular mail to inform them of her BTC address. If an embodiment of CW is a deterministic wallet that generates a continuous stream of child public keys and child addresses, then it can continuously update Alice's DKA with the most recent payment addresses for various cryptocurrencies Alice deals with.

CW server: The reader may have noticed that the CWs are akin to email accounts with email IDs and a dedicated encrypted communication channel cw. The CW framework provides a CW Server that is simply cloud storage for a CW to dump an encrypted message for another CW into the storage and the other CW to retrieve and decrypt.

Sending a payment request: Unlike a payment request with traditional crypto wallets where Alice would first create a payment request in her wallet, generate a payment token and/or a QR code, and send it by email or some other (typically unencrypted) means to Bob, who will then input the information into his wallet to make a payment, Alice can create a payment request for Bob directly in her CW as in FIG. 16. On given a payment request, a deterministic embodiment of CW will generate a new child public key (from a master public key) and an address for the stated cryptocurrency, look up Bob's DKA to find Bob's public key under the selector cw and use this key to send an encrypted payment request directly to Bob's CW. Simultaneously, it can also send Bob a regular encrypted email using Bob's public key with the default email selector to inform Bob of the payment request waiting for him in his CW.

Paying a payment request: Normally, when a crypto payment is made, it is broadcast to the underlying blockchain. The payee's wallet has to keep polling the blockchain to see if the payment has been made, and where the transaction is in the queue of blocks waiting to be mined. Further, the payer gets a confirmation as soon as the blockchain determines that the payer has sufficient funds for the payment, whereas the payee's transaction may lag by a few cycles. If the wallets have their own encrypted communication channels, then a considerable amount of polling and/or anticipation can be avoided. Our CW maintains a payment state for a payment request as follows: request delivered (to the payer's wallet), payer informed (email delivered to the payer's email), payment made (as informed by payer's wallet), payer receives confirmation (as informed by payer's wallet), payment completed (payee receives confirmation). It also maintains a soft balance and a hard balance. The hard balance is the crypto amount from transactions that have been fully confirmed, whereas the soft balance is the amount that is not yet confirmed by the blockchain but confirmed by the payer's wallet.

CONCLUSION

This disclosure described a public, distributed, and decentralized framework with which users can distribute the public keys of their email IDs. By leveraging the domain system and the email system, the framework guarantees the binding between the email ID and the public key and provides precisely two places where the public key for an email ID can be found. The framework is deterministic in the sense a search for the public key can stop if no key is found in one of these two places. The binding between the public key and email ID is not dependent on third-party certificates or certificate authorities, though the framework is compatible with certificates if a given application requires them. The root DKA ensures that the framework is usable for any user with an email ID irrespective of whether the user's domain supports a DKA or not. We showed that the disclosed framework can support encrypted email much more gracefully than existing techniques such as OpenPGP and s/Mime and can support password-less authentication and crypto wallets.

The invention claimed is:

1. An email system comprising:

one or more processors coupled to non-transitory computer-readable storage media storing program instructions that, when executed by the one or more processors, cause the email system to:

receive an email for transmission to a recipient, the email specifying a recipient email address;

determine, from the recipient email address, a recipient domain portion, wherein the recipient domain portion is a portion of the recipient email address following an "@" symbol;

query at least one Domain Name System (DNS) record based at least in part on the recipient domain portion to obtain DKA addressing information that identifies a Domain Key Authority for the recipient email address (recipient DKA), wherein the recipient DKA is configured to serve a recipient public key whose association with the recipient email address has been verified using a verification process that verifies control of the recipient email address;

transmit a public-key request for the recipient public key to the recipient DKA;

receive the recipient public key from the recipient DKA; and encrypt at least a portion of the content of the email based at least in part on the recipient public key.

2. The email system of claim 1, wherein the recipient DKA is configured to serve public keys for email addresses whose domain portion equals the recipient domain portion.

3. The email system of claim 1, wherein the recipient DKA comprises a root Domain Key Authority (rDKA) configured to serve public keys for email addresses whose domain portion equals one of a plurality of Internet domains.

4. The email system of claim 3, wherein the program instructions further cause the email system to use the rDKA as the recipient DKA after determining that a domain-specific DKA designated for the recipient domain portion does not return a public key for the recipient email address.

5. The email system of claim 1, wherein encrypting at least the portion of the content of the email comprises:

generating a symmetric key;

encrypting the portion of the content of the email using the symmetric key; and encrypting the symmetric key using the recipient public key.

6. The email system of claim 1, wherein the program instructions further cause the email system to:

generate an asymmetric cryptographic key pair comprising a second public key and a second private key;

store the second private key in the email system; and transmit the second public key to a Domain Key Authority as a public key associated with an email address of a user of the email system.

7. The email system of claim 1, wherein the program instructions further cause the email system to:

attach a digital signature to the email, wherein the digital signature is based, at least in part, on the content of the email and a private key of a user of the email system.

8. The email system of claim 1, wherein the program instructions further cause the email system to:

receive an encrypted email addressed to a user email address of a user of the email system, wherein the content of the encrypted email is encrypted using a user public key published in a Domain Key Authority for the user email address;

decrypt the content of the encrypted email using a user private key corresponding to the user public key.

9. The email system of claim 1, wherein the program instructions further cause the email system to:

receive a second email from a sender email address;

determine, from the sender email address, a sender domain portion, wherein the sender domain portion is a portion of the sender email address following an "@" symbol;

query at least one DNS record based at least in part on the sender domain portion to obtain sender DKA addressing information that identifies a Domain Key Authority for the sender email address (sender DKA), wherein the sender DKA is configured to serve a sender public key whose association with the sender email address has been verified using a verification process that verifies control of the sender email address;

transmit a public-key request for the sender public key to the sender DKA;

receive the sender public key from the sender DKA; and verify a digital signature on the second email using the sender public key.

10. The email system of claim 1, wherein the verification process verifies that a submitting entity that submitted the recipient public key for association with the recipient email address has control of a mailbox corresponding to the recipient email address.

11. The email system of claim 1, wherein the verification process verifies control of the recipient email address by sending a verification token to the recipient email address and receiving, from a mailbox corresponding to the recipient email address, a reply email containing a reply verification token derived at least in part from the verification token.

12. The email system of claim 1, wherein the verification process verifies control of the recipient email address by determining that an email having a From address field identifying the recipient email address satisfies a DomainKeys Identified Mail (DKIM) authentication check for the recipient domain portion.

13. A computer-implemented method for email processing, the method comprising:

receiving an email for transmission to a recipient, the email specifying a recipient email address;

determining, from the recipient email address, a recipient domain portion, wherein the recipient domain portion is a portion of the recipient email address following an "@" symbol;

querying at least one Domain Name System (DNS) record based at least in part on the recipient domain portion to obtain DKA addressing information that identifies a Domain Key Authority for the recipient email address (recipient DKA), wherein the recipient DKA is configured to serve a recipient public key whose association with the recipient email address has been verified using a verification process that verifies control of the recipient email address;

transmitting a public-key request for the recipient public key to the recipient DKA;

receiving the recipient public key from the recipient DKA; and encrypting at least a portion of the content of the email based at least in part on the recipient public key.

14. The method of claim 13, wherein the recipient DKA is configured to serve public keys for email addresses whose domain portion equals the recipient domain portion.

15. The method of claim 13, wherein the recipient DKA comprises a root Domain Key Authority (rDKA) configured to serve public keys for email addresses whose domain portion equals one of a plurality of Internet domains.

16. The method of claim 13, wherein the verification process verifies that a submitting entity that submitted the recipient public key for association with the recipient email address has control of a mailbox corresponding to the recipient email address.

17. A non-transitory computer-readable storage medium storing instructions that, when executed by one or more processors of an email system, cause the email system to:

receive an email for transmission to a recipient, the email specifying a recipient email address;

determine, from the recipient email address, a recipient domain portion, wherein the recipient domain portion is a portion of the recipient email address following an "@" symbol;

query at least one Domain Name System (DNS) record based at least in part on the recipient domain portion to obtain DKA addressing information that identifies a Domain Key Authority for the recipient email address (recipient DKA), wherein the recipient DKA is configured to serve a recipient public key whose association with the recipient email address has been verified using a verification process that verifies control of the recipient email address;

transmit a public-key request for the recipient public key to the recipient DKA;

receive the recipient public key from the recipient DKA; and encrypt at least a portion of the content of the email based at least in part on the recipient public key.

18. The computer-readable storage medium of claim 17, wherein the recipient DKA is configured to serve public keys for email addresses whose domain portion equals the recipient domain portion.

19. The computer-readable storage medium of claim 17, wherein the recipient DKA comprises a root Domain Key Authority (rDKA) configured to serve public keys for email addresses whose domain portion equals one of a plurality of Internet domains.

20. The computer-readable storage medium of claim 17, wherein the verification process verifies that a submitting entity that submitted the recipient public key for association with the recipient email address has control of a mailbox corresponding to the recipient email address.

* * * * *